(12) United States Patent
Wilson et al.

(10) Patent No.: US 9,436,339 B1
(45) Date of Patent: Sep. 6, 2016

(54) TOUCH SENSOR PATTERN

(71) Applicant: Cypress Semiconductor Corporation, San Jose, CA (US)

(72) Inventors: Cole D. Wilson, Everett, WA (US); Patrick N Prendergast, Clinton, WA (US); Jonathan R Peterson, Everett, WA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 14/677,769

(22) Filed: Apr. 2, 2015

Related U.S. Application Data

(63) Continuation of application No. 13/424,361, filed on Mar. 19, 2012, now Pat. No. 9,007,333.

(60) Provisional application No. 61/602,534, filed on Feb. 23, 2012.

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01); *G06F 2203/04103* (2013.01); *G06F 2203/04111* (2013.01)

(58) Field of Classification Search
CPC ................. G06F 3/044; G06F 3/0418; G06F 2203/04103; G06F 2203/04111
See application file for complete search history.

(56) References Cited

U.S. PATENT DOCUMENTS

| | | | |
|---|---|---|---|
| 2006/0278444 A1 | 12/2006 | Binstead | |
| 2007/0008299 A1 | 1/2007 | Hristov | |
| 2009/0194344 A1* | 8/2009 | Harley | G06F 3/044 178/18.06 |
| 2009/0195511 A1 | 8/2009 | Cites et al. | |
| 2009/0273573 A1* | 11/2009 | Hotelling | G06F 3/0362 345/173 |
| 2010/0079384 A1 | 4/2010 | Grivna | |
| 2010/0149108 A1 | 6/2010 | Hotelling et al. | |
| 2010/0265205 A1 | 10/2010 | Park et al. | |
| 2010/0302201 A1* | 12/2010 | Ritter | G06F 3/044 345/174 |
| 2011/0050617 A1* | 3/2011 | Murphy | G06F 3/0418 345/174 |
| 2011/0102366 A1 | 5/2011 | Juan et al. | |
| 2011/0234526 A1 | 9/2011 | Mi | |
| 2011/0291982 A1* | 12/2011 | Hsieh | G06F 3/044 345/173 |
| 2011/0316567 A1* | 12/2011 | Chai | G06F 3/044 324/686 |
| 2012/0133611 A1* | 5/2012 | Chai | G06F 3/044 345/174 |

OTHER PUBLICATIONS

Tim Blankenship and Tim Wang, "Projected-Capacitive Touch Systems from the Controller Point of View", Dated Jun. 10, 2011; 6 Pages.
Todd O'Connor "mTouch Projected Capacitive Touch Screen Sensing Theory of Operation", Dated 2012; 16 pages.
(Continued)

*Primary Examiner* — Andrew Sasinowski

(57) ABSTRACT

A capacitive sensor array includes a second sensor element intersecting a first sensor element to form an intersection associated with a unit cell. The second sensor element includes, within the unit cell: a first primary trace crossing the unit cell and a second primary trace crossing the unit cell, a first secondary trace connecting the first primary trace and the second primary trace, and a first tertiary trace branching away from the first secondary trace between the first primary trace and the second primary trace. An area of the first sensor element is greater than an area of the second sensor element within the unit cell.

20 Claims, 8 Drawing Sheets

(56) References Cited

OTHER PUBLICATIONS

USPTO Advisory Action for U.S. Appl. No. 13/424,361 dated Oct. 28, 2014; 6 pages.
USPTO Final Rejection for U.S. Appl. No. 13/424,361 dated Aug. 19, 2014; 14 pages.
USPTO Non-Final Rejection for U.S. Appl. No. 13/424,361 dated May 19, 2014; 14 pages.
USPTO Non-Final Rejection for U.S. Appl. No. 13/424,361 dated Nov. 10, 2014; 14 pages.
USPTO Notice of Allowance for U.S. Appl. No. 13/424,361 dated Mar. 2, 2015; 5 pages.

* cited by examiner

TOUCH SENSOR PATTERN

CROSS REFERENCE TO RELATED APPLICATIONS

This application is a continuation of U.S. patent application Ser. No. 13/424,361, filed Mar. 19, 2012, which claims priority to U.S. Provisional Application No. 61/602,534, filed Feb. 23, 2012, all of which are incorporated by reference herein in their entirety.

TECHNICAL FIELD

This disclosure relates to the field of touch-sensors and, in particular, to trace patterns of elements in capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

An embodiment of a capacitive touch sensor pattern may be constructed from a single patterned layer of conductive material and may have a trace geometry that minimizes regional geometric disparity without the use of excessive metal bridges.

In one embodiment, such a capacitive touch sensor pattern may include two sets of intersecting sensor elements, where each sensor element in a first set intersects each sensor element of the other set. One set of sensor elements may be used as transmit (TX) electrodes, while the other set of sensor elements is used as receive (RX) electrodes in a mutual capacitance sensing system. In an alternative embodiment, the sensor elements may be used in a self-capacitance sensing system. In one embodiment, each of the sensor elements of one set includes a main trace and one or more primary subtraces branching from the main trace. The sensor elements may also include one or more secondary subtraces branching from the primary subtraces and one or more tertiary subtraces branching away from the secondary subtraces.

In one embodiment, a touch sensor pattern may include a number of unit cells, where a unit cell corresponding to a TX-RX pair of sensor elements may be defined as an area wherein each point within the unit cell area is nearest to an intersection between the TX-RX pair than to any intersection between a different TX-RX pairing.

In one embodiment, each unit cell of a capacitive touch sensor pattern may contain a main trace crossing the unit cell, at least a portion of a primary subtrace branching perpendicularly away from the main trace, at least four secondary subtraces branching away from the primary subtraces, and at least two tertiary subtraces branching away from each of the secondary subtraces. In one embodiment, the main trace and subtraces may form a grid-like pattern resembling a trellis.

In one embodiment, both TX and RX sets of sensor elements may be constructed using a single patterned layer of conductive material, with bridges used to join sections of the sensor elements that are separated at intersections between the TX and RX pairs.

Figure 1:
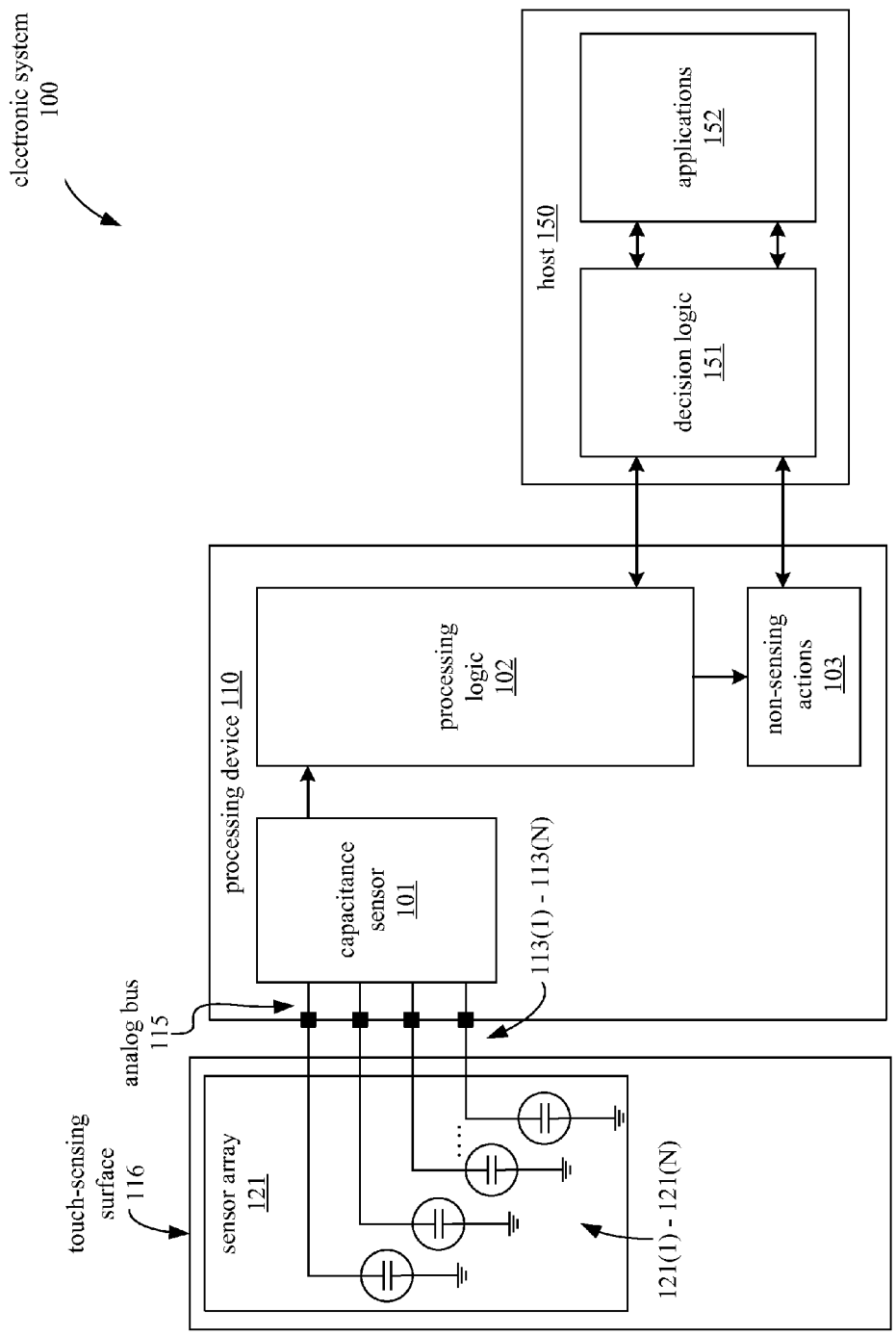
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116 including a capacitive touch sensor pattern as described above. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
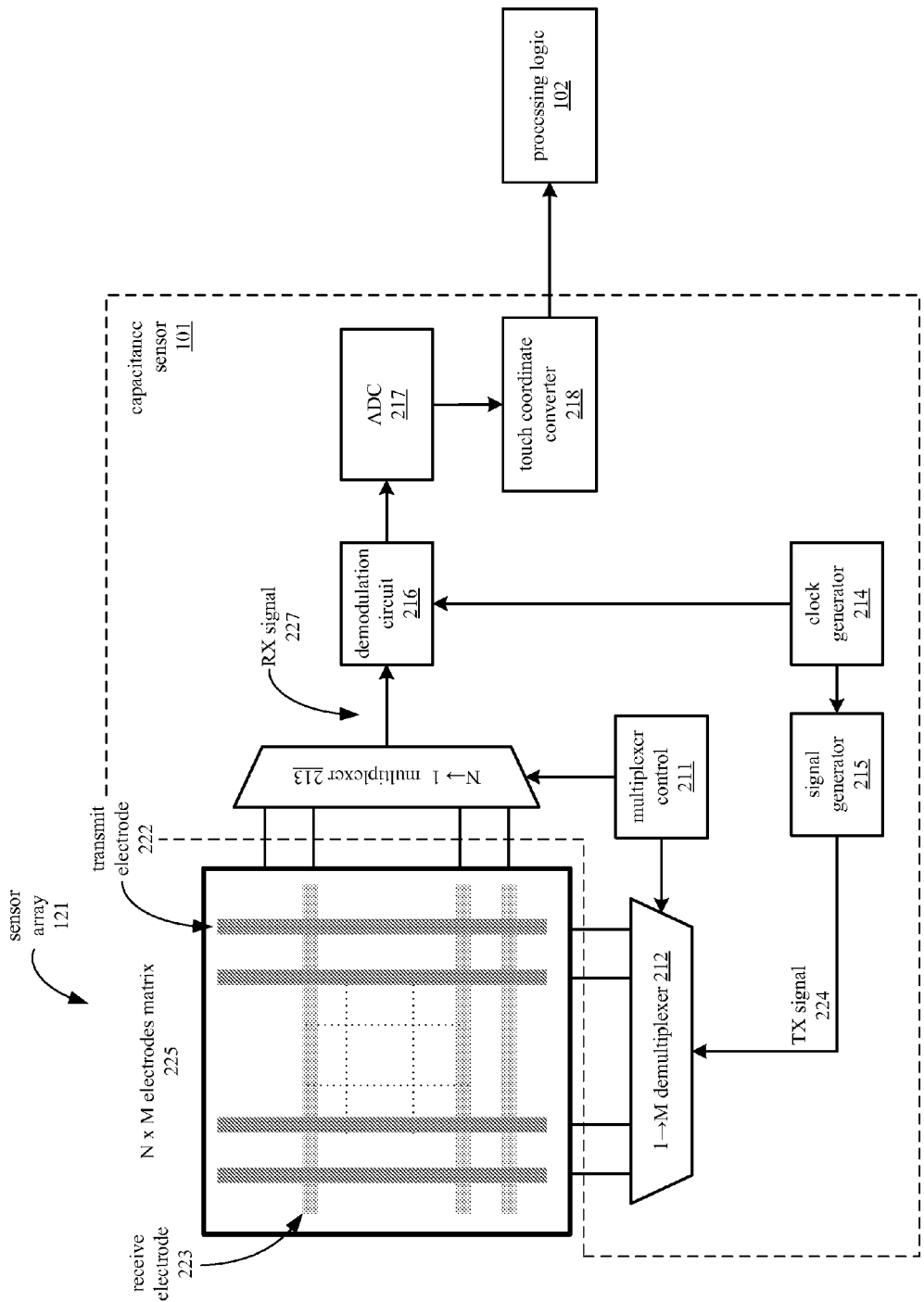
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts changes in measured capacitances to coordinates indicating the presence and location of touch. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a change in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensor or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

Figure 3A:
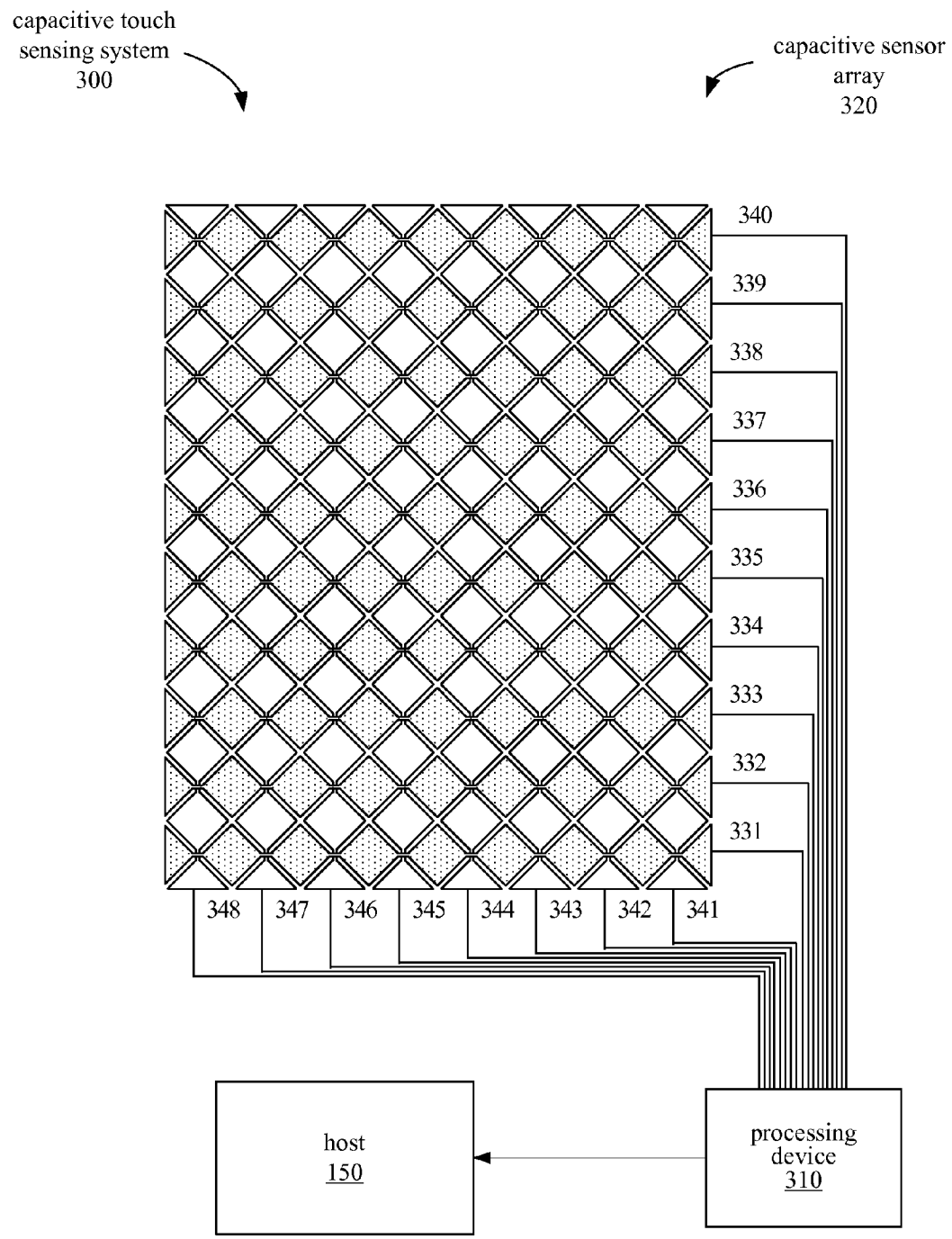
FIG. 3A illustrates an embodiment of an electronic touch-sensing system using a dual solid diamond capacitive sensor pattern.

FIG. 3A illustrates an embodiment of a capacitive touch sensing system 300 that includes a capacitive sensor array 320. Capacitive sensor array 320 includes a plurality of row sensor elements 331-340 and a plurality of column sensor elements 341-348. The row and column sensor elements 331-348 are connected to a processing device 310, which may include the functionality of capacitance sensor 101, as illustrated in FIG. 2. In one embodiment, the processing device 310 may perform TX-RX scans of the capacitive sensor array 320 to measure a mutual capacitance value associated with each of the intersections between a row sensor element and a column sensor element in the sensor array 320. The measured capacitances may be further processed to determine higher resolution locations of one or more contacts at the capacitive sensor array 320.

In one embodiment, the processing device 310 is connected to a host 150 which may receive the measured capacitances or calculate high precision locations from the processing device 310.

Figure 3B:
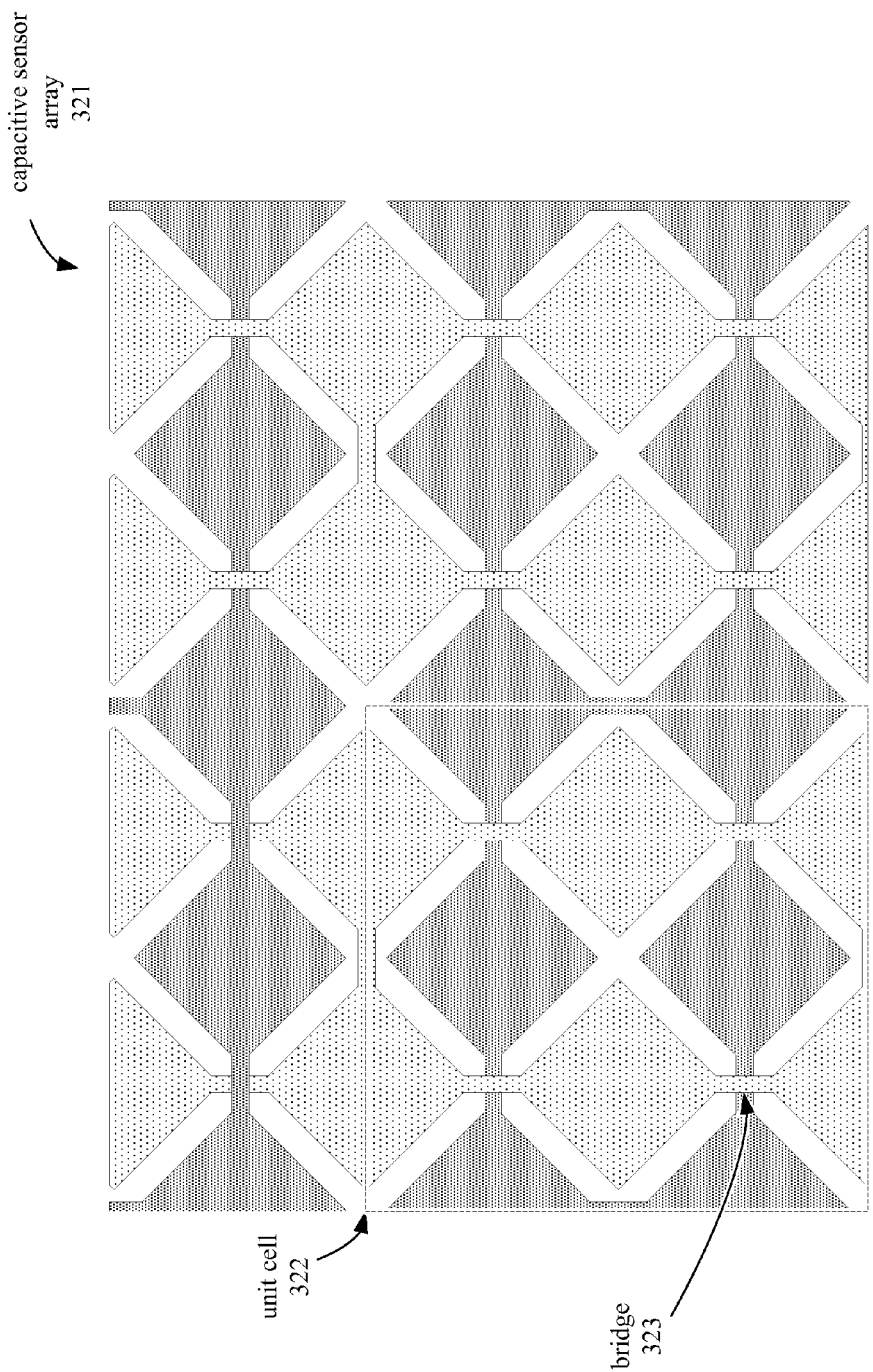
FIG. 3B illustrates an embodiment of a dual solid diamond capacitive sensor pattern.

The sensor array 320 illustrated in FIG. 3A includes sensor elements arranged in a diamond pattern. Specifically, the sensor elements 331-348 of sensor array 320 are arranged in a single solid diamond (SSD) pattern. FIG. 3B illustrates a capacitive sensor array 321 having an alternate embodiment of the diamond pattern, which is the dual solid diamond (DSD) pattern. Each of the sensor elements of capacitive sensor array 321 includes two rows or columns of electrically connected diamond shaped traces. Relative to the SSD pattern, the DSD pattern has improved signal disparity characteristics due to an increase in the coupling between TX and RX sensor elements while maintaining the same self-capacitance coupling possible between each sensor element and a conductive object near the sensor element. The DSD pattern may also provide higher sensitivity for tracking smaller objects, such as the point of a stylus, as compared to patterns having larger features, such as SSD. However, the DSD pattern also increases the number of bridges (such as bridge 323) used to create the pattern, which may result in decreased manufacturing yield. The increased number of bridges may also be visible if metal bridges are used. For example, sensor array 321 includes four bridges within unit cell 322.

Figure 4A:
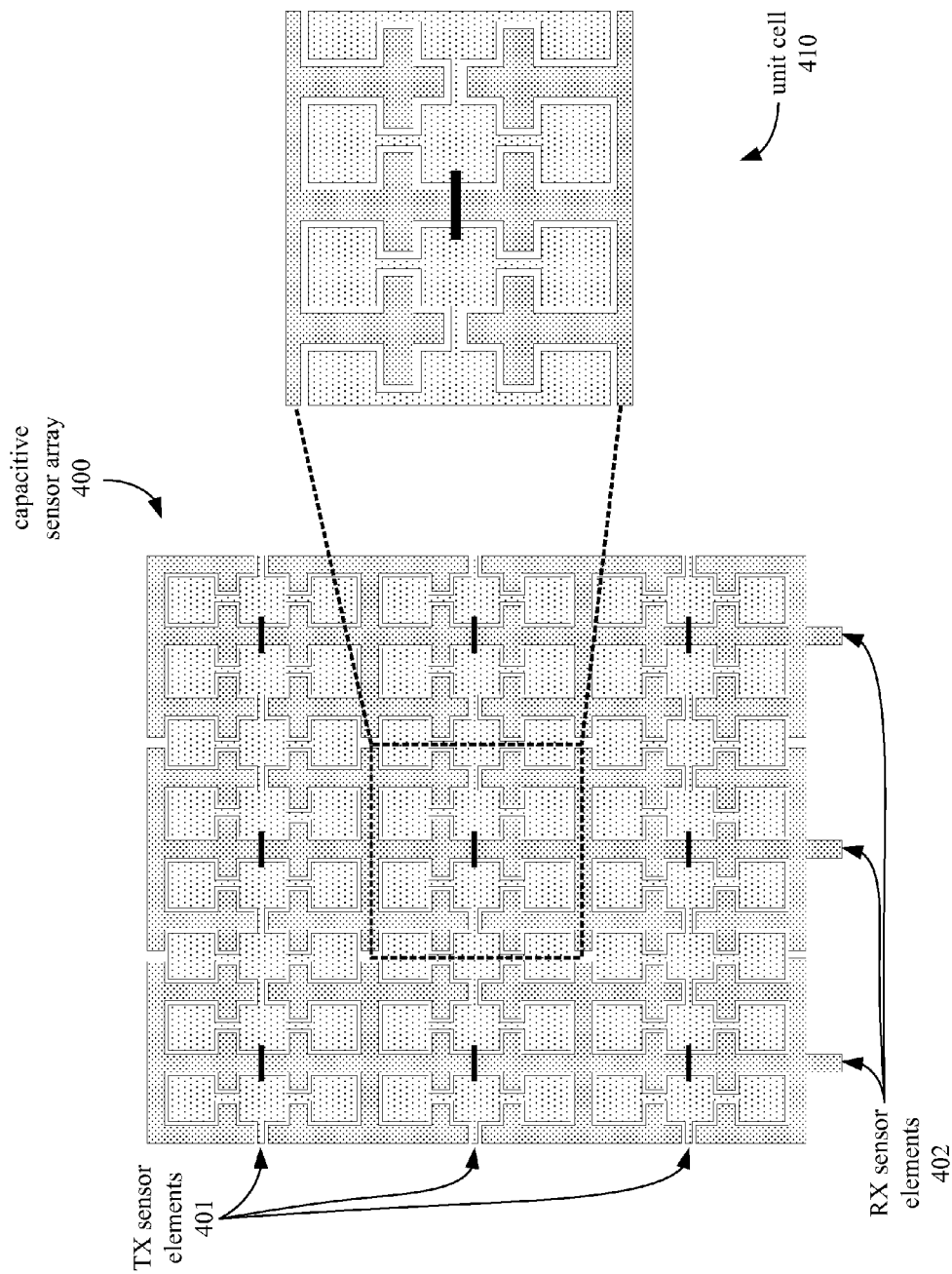
FIG. 4A illustrates an embodiment of a capacitive sensor array having a trellis pattern.

FIG. 4A illustrates an embodiment of a capacitive sensor array 400 having a grid-like trellis or lattice pattern. In contrast with the SSD and DSD patterns, the sensor array 400 may have increased signal, decreased noise, and increased manufacturing yield. In one embodiment, the capacitive sensor array 400 may be used to implement a multi-touch sensing surface controlled by a capacitive touch-screen controller, which may be implemented by a processing device such as device 110, for example.

In one embodiment, capacitive sensor array 400 may be constructed by printing, etching, depositing, or otherwise placing conductive material onto a substrate. For example, the sensor array pattern may be constructed from Indium Tin Oxide (ITO) or some other conductive material deposited onto a transparent substrate such as glass to create a transparent touch-sensing surface.

As compared to the SSD and DSD patterns, an embodiment of the pattern for sensor array 400 may have a longer boundary length within each unit cell between the TX and RX sensor elements, while minimizing the number of metal bridges per unit cell. This results in a pattern capable of producing an increased signal level, and having a more uniformly distributed sensitivity across the touch-sensing surface. In one embodiment, such a pattern may also reduce the signal disparity between grounded and ungrounded systems. High coupling from the RX signals back to the AC ground of the TX buses may also increase the pattern's resistance to injected noise sources.

With reference to FIG. 4A, capacitive sensor array 400 includes two sets of sensor elements. In one embodiment, sensor elements 401 may be used as transmit (TX) sensor elements and sensor elements 402 may be used as receive (RX) sensor elements in a mutual capacitance sensing system. Capacitive sensor array 400 is constructed such that each of the RX sensor elements 402 intersects each of the TX sensor elements to form a unit cell (such as unit cell 410) associated with each of the intersections between unique pairs of TX and RX elements. In one embodiment, each point within the boundaries of each unit cell is nearest to an intersection between the corresponding TX-RX pair of sensor elements than to any other intersection of a different TX-RX pair.

Figure 4B:
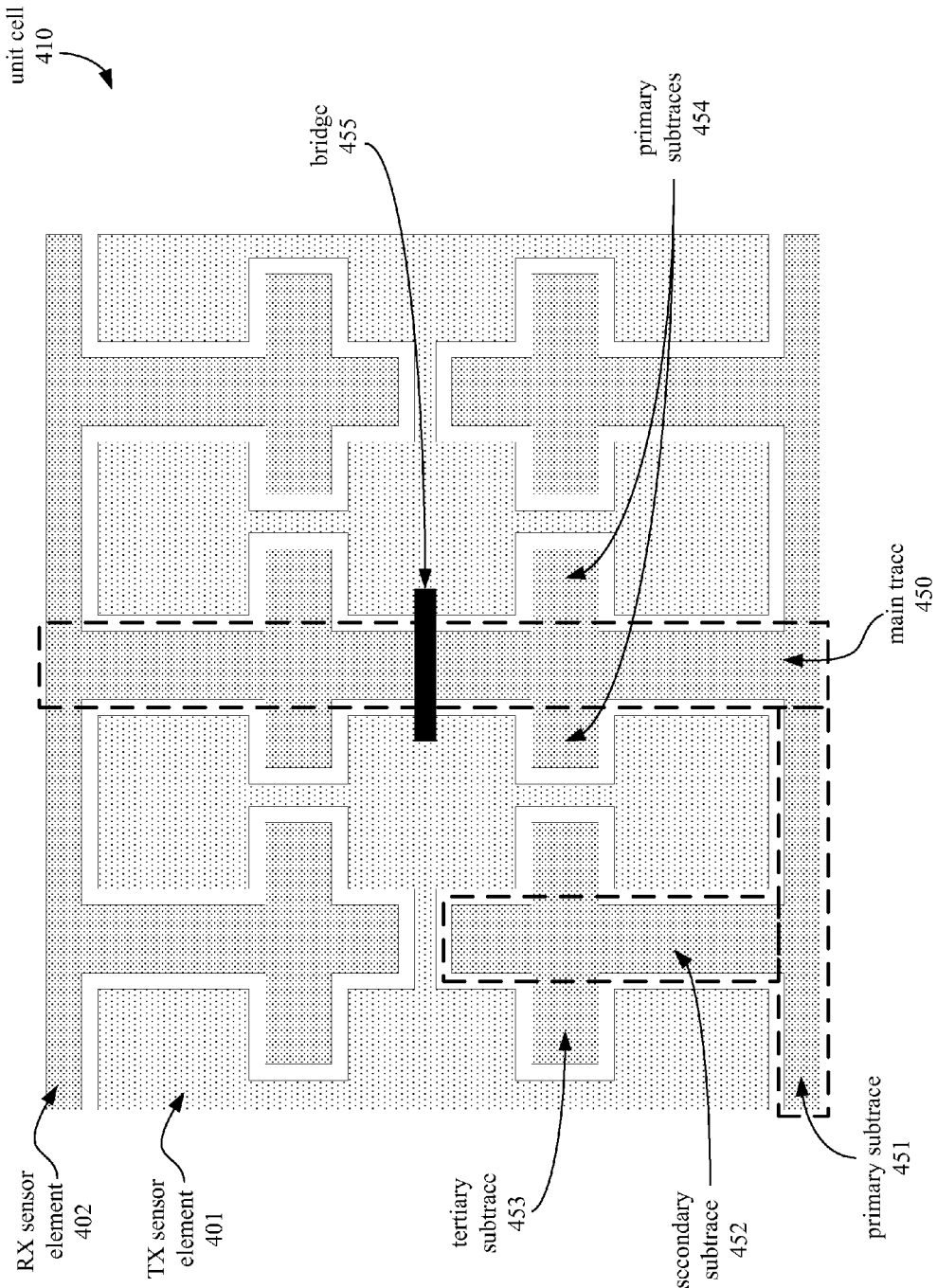
FIG. 4B illustrates a unit cell of a capacitive sensor array, according to one embodiment.

In one embodiment, each of the RX sensor elements 402 includes a main trace that crosses at least one of the plurality of unit cells. FIG. 4B illustrates one unit cell 410 of capacitive sensor array 400, according to an embodiment. Within the unit cell 410, the RX sensor element includes a main trace 450 that crosses the unit cell 410, with at least a portion of one or more primary subtraces, such as primary subtrace 451, branching away from the main trace 450. In one embodiment, the primary subtrace may branch away from the main trace such that a longitudinal axis of the primary subtrace is perpendicular to a longitudinal axis of the main trace at the junction between the main trace and the primary subtrace.

Within the area of the unit cell 410, the RX sensor element may include a secondary subtrace, such as subtrace 452, that branches away from a primary subtrace, such as subtrace 451. In one embodiment, the unit cell 410 may include four secondary subtraces, as illustrated in FIG. 4B. For example, the sensor element 402 may include four primary subtraces (including subtrace 451) branching away from the main trace 450, and may further include a secondary subtrace branching away from each of the primary subtraces. In one embodiment, the secondary subtraces may have a longitudinal axis that is perpendicular to a longitudinal axis of the primary subtrace from which it branches.

In one embodiment, the sensor element 402 may also include one or more tertiary subtraces (such as tertiary subtrace 453) branching away from each secondary subtrace. As illustrated in FIG. 4B, two tertiary subtraces may branch away from each secondary subtrace. In one embodiment, a longitudinal axis of each tertiary subtrace may be perpendicular to a longitudinal axis of the secondary subtrace from which it branches.

In one embodiment, the tertiary subtraces may be rectangular, and may have two corners which can be described as "ear" vertexes. An ear vertex of a given shape may be described as any vertex where a line connecting the vertexes on either side of the ear vertex passes through the interior of the shape. In contrast, a "mouth" vertex is a vertex where such a line lies outside the shape.

In one embodiment, the sensor element 402 may also include additional primary subtraces (such as subtraces 454) branching away from the main trace 450. In one embodiment, these primary subtraces 454 may be aligned along an axis with tertiary subtraces. The primary subtraces such as subtraces 454 may be rectangular in shape, and may be similar in shape to the tertiary subtraces. Each of the primary subtraces may also have two corners that are ear vertexes.

In one embodiment, a bridge 455 may be used to connect portions of a sensor element, such as TX sensor element 401. Bridge 455 may be made from metal or some other conductive material and may be used to electrically connect the portions of sensor element 401 that are otherwise separated by the main trace 450 of sensor element 402. In one embodiment, the sensor elements 402 and 401 are deposited on or constructed from a single layer of conductive material. In one embodiment, each unit cell of the capacitive sensor array pattern 400 includes no more than one bridge. In one embodiment, the size of the bridge 455 may be reduced by tapering the TX or RX sensor elements at the intersection to decrease the distance crossed by the bridge 455.

In one embodiment, the TX sensor element may fill substantially all of the negative space left by the RX sensor element, leaving a gap between the edges of the RX and TX sensor elements. The gap may be uniform, or may vary over the boundary length between the RX and TX sensor elements.

In one embodiment, the trellis pattern as illustrated in FIGS. 4A and 4B results in a longer boundary length between the TX and RX sensor elements, as compared to a similarly-sized area of the SSD or DSD patterns. In one embodiment, this results in a higher touch signal sensitivity, and a more homogeneous distribution of sensitivity throughout the unit cell.

In one embodiment, the trellis pattern of capacitive sensor array 400 also provides a stronger path to ground, increasing noise immunity. The trellis pattern may also decrease signal disparity effects, while using only one bridge per unit cell to connect the sensor elements.

The trellis pattern may also allow for additional coupling when a conductive object is between sensor elements. This has the effect of reducing the difference between the maximum observed signal and the minimum observed signal.

In one embodiment, the smaller features of the primary, secondary, and tertiary subtraces may allow detection of a smaller conductive object, such as a stylus tip, at the touch-sensing surface.

Figure 5A:
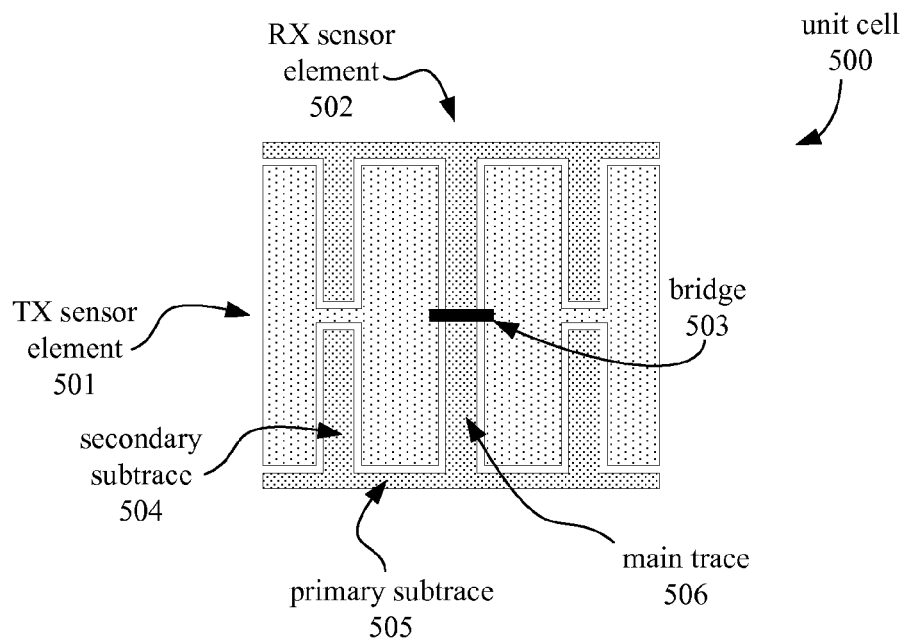
FIG. 5A illustrates a unit cell of a capacitive sensor array, according to one embodiment.

FIG. 5A illustrates a unit cell 500 of a simplified variation of the trellis pattern, according to one embodiment. Unit cell 500 is associated with an intersection between RX sensor element 502 and TX sensor element 501. Portions of sensor element 501 on either side of a main trace 506 of sensor element 502 are connected by a bridge 503.

In one embodiment, the RX sensor element 502 may include a primary subtrace 505 branching perpendicularly away from the main trace 506, and a secondary subtrace 504 branching perpendicularly away from the primary subtrace 505. In alternative embodiments, primary and secondary subtraces may be added to the sensor element 502 to maximize the boundary length between the RX and TX sensor elements 502 and 501.

In one embodiment, the sensitivity distribution of a capacitive sensor array may be controlled by the distribution of vertexes within each unit cell. Since charge tends to accumulate at the corners of the sensor element, an even distribution of such vertexes may result in corresponding even distribution of sensitivity across the unit cell.

Figure 5B:
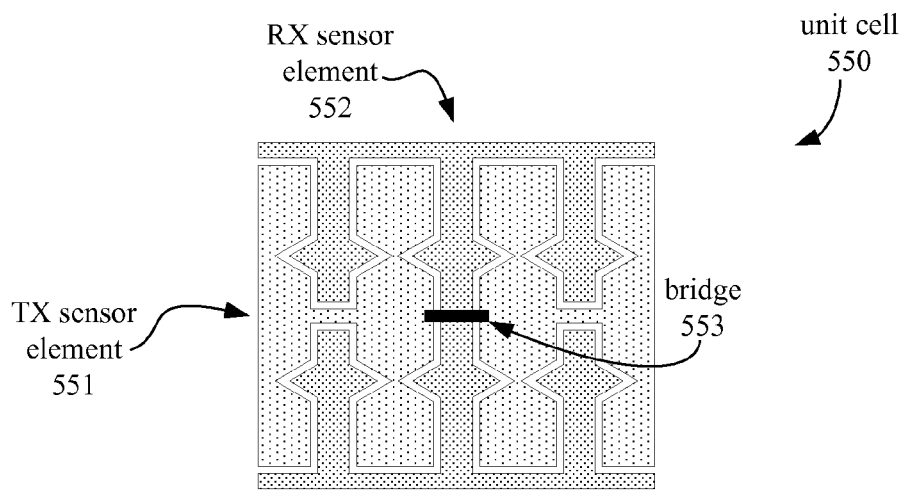
FIG. 5B illustrates a unit cell of a capacitive sensor array, according to one embodiment.

With reference to FIG. 4B, the shape of sensor element 402 that is contained within unit cell 410 includes 32 ear vertexes formed by the corners of the primary and tertiary subtraces. FIG. 5B illustrates an embodiment of a unit cell 550 for a capacitive sensor array pattern where the tertiary subtraces and smaller primary subtraces are in the shape of triangles. The portion of RX sensor element 552 that is within the unit cell 550 includes 20 ear vertexes, eight of which are formed by the points of the tertiary subtraces, four by the points of primary subtraces, and eight by the corners of the rectangular secondary subtraces. Bridge 553 connects the separate portions of the TX sensor element 551. Alternative embodiments of the sensor pattern may have more than 20 ear vertexes (such as the pattern illustrated in FIG. 4B).

In an alternative embodiment, the triangular traces in FIG. 5B may instead be replaced by other shapes, such as rectangles, circles, diamonds, stars, n-gons, or other shapes.

Figure 6A:
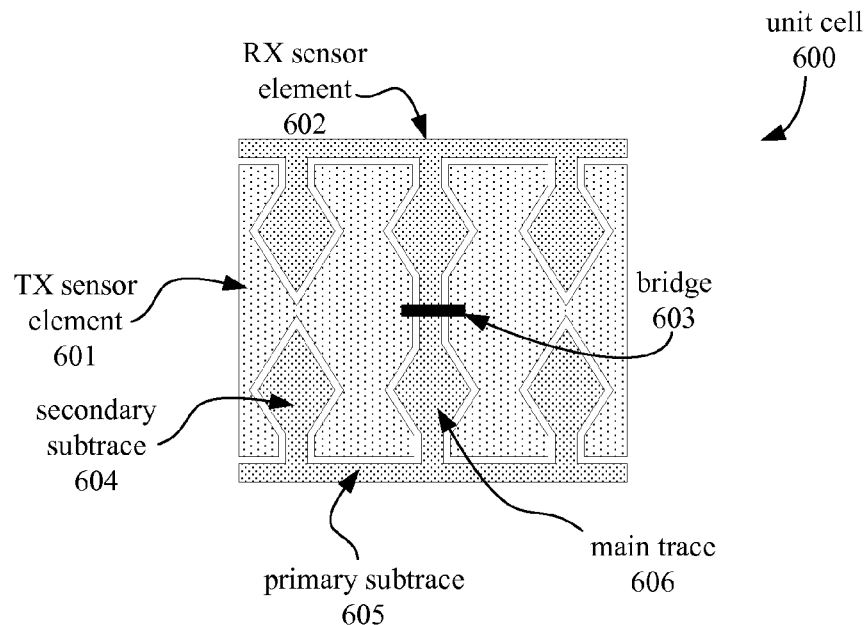
FIG. 6A illustrates a unit cell of a capacitive sensor array, according to one embodiment.

FIG. 6A illustrates a unit cell 600 of a capacitive sensor pattern including an RX sensor element 602 and a TX sensor element 601, according to an embodiment. Separate portions of the TX sensor element 601 are electrically connected by a bridge 603.

The RX sensor element 602 includes a main trace 606. Primary subtrace 605 branches perpendicularly from the main trace 606, and secondary subtrace 604 branches perpendicularly from primary subtrace 605. In one embodiment, the secondary subtrace 604 is substantially in the shape of a diamond. The sensor pattern illustrated in FIG. 6A eliminates a number of vertexes relative to the trellis pattern illustrated in FIG. 4B.

Figure 6B:
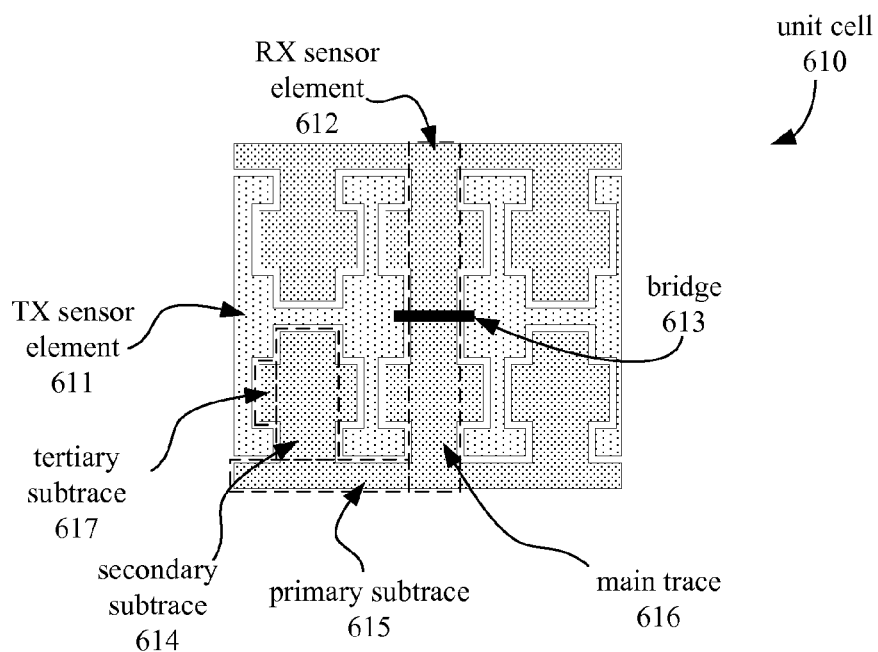
FIG. 6B illustrates a unit cell of a capacitive sensor array, according to one embodiment.

FIG. 6B illustrates a unit cell 610 of a capacitive sensor pattern including an RX sensor element 612 and a TX sensor element 611, according to an embodiment. Separate portions of the TX sensor element 611 are electrically connected by a bridge 613.

The RX sensor element 612 includes a main trace 616. Primary subtrace 615 branches perpendicularly from the main trace 616, and secondary subtrace 614 branches perpendicularly from primary subtrace 615.

In one embodiment, the pattern illustrated in FIG. 6B is similar to the pattern of FIG. 4B, but with a different ratio between the areas of the RX and TX sensor elements. Thus, the ratio of these areas may be adjusted to affect performance parameters, such as signal disparity performance, susceptibility to charger noise, and LCD noise immunity. In one embodiment, the TX sensor elements may make up 50% of the area of the conductive material, while the RX sensor elements may make up the remaining 50% of the area.

In one embodiment, trace widths between sections of the TX sensor element may be increased to reduce the resistance of the TX sensor element. For example, the size of the tertiary subtraces, such as subtrace 617, may be decreased to increase the widths of the thinner connecting portions of the TX sensor element 611.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitive sensor array comprising:
   a first sensor element; and
   a second sensor element intersecting the first sensor element to form an intersection associated with a unit cell, the second sensor element comprising, within the unit cell, a first primary trace crossing the unit cell and second primary trace crossing the unit cell, a first secondary trace connecting the first primary trace and the second primary trace, and a first tertiary trace branching away from the first secondary trace between the first primary trace and the second primary trace, wherein an area of the first sensor element is greater than an area of the second sensor element within the unit cell.

2. The capacitive sensor array of claim 1, wherein the first sensor element comprises a transmit (TX) sensor element and the second sensor element comprises a receive (RX) sensor element.

3. The capacitive sensor array of claim 1, wherein the second sensor element further comprises, within the unit cell, a second secondary trace connecting the first primary trace and the second primary trace and a second tertiary trace branching away from the second secondary trace between the first primary trace and the second primary trace.

4. The capacitive sensor array of claim 3, wherein a longitudinal axis of each of the first and second secondary traces is perpendicular to the first and second primary traces at a junction between the secondary trace and the primary trace.

5. The capacitive sensor array of claim 3, wherein the first tertiary trace is aligned along a same axis as the second tertiary trace.

6. The capacitive sensor array of claim 3, wherein at least a portion of at least one of the first primary trace, the second primary trace, the first secondary trace, the second secondary trace, the first tertiary trace or the second tertiary trace falls within a second unit cell.

7. The capacitive sensor array of claim 1, wherein the unit cell further comprises a single bridge coupled to the first sensor element.

8. A capacitive touch-sensing system comprising:
   a capacitive sensor array comprising a plurality of intersections between a plurality of first sensor elements and a second sensor element, wherein each of the plurality of intersections is associated with a unit cell, the second sensor element comprising, within each unit cell, a first primary trace crossing the unit cell and second primary trace crossing the unit cell, a first secondary trace connecting the first primary trace and the second primary trace, and a first tertiary trace branching away from the first secondary trace between the first primary trace and the second primary trace, wherein an area of the first sensor element is greater than an area of the second sensor element within the unit cell; and
   a capacitance sensor coupled to the capacitive sensor array, wherein the capacitance sensor is configured to measure a mutual capacitance for each of the plurality of intersections between the plurality of first sensor elements and the second sensor element.

9. The capacitive touch-sensing system of claim 8, wherein the first sensor element comprises a transmit (TX) sensor element and the second sensor element comprises a receive (RX) sensor element.

10. The capacitive touch-sensing system of claim 8, wherein the second sensor element further comprises, within the unit cell, a second secondary trace connecting the first primary trace and the second primary trace and a second tertiary trace branching away from the second secondary trace between the first primary trace and the second primary trace.

11. The capacitive touch-sensing system of claim 10, wherein a longitudinal axis of each of the first and second secondary traces is perpendicular to the first and second primary traces at a junction between the secondary trace and the primary trace.

12. The capacitive touch-sensing system of claim 10, wherein the first tertiary trace is aligned along a same axis as the second tertiary trace.

13. The capacitive touch-sensing system of claim 10, wherein at least a portion of at least one of the first primary trace, the second primary trace, the first secondary trace, the second secondary trace, the first tertiary trace or the second tertiary trace falls within a second unit cell.

14. The capacitive touch-sensing system of claim 8, wherein the unit cell further comprises a single bridge coupled to the first sensor element.

15. A capacitive sensor array comprising:
   a first plurality of sensor elements; and
   a second sensor element intersecting each of the first plurality of sensor elements to form a plurality of intersections, wherein each of the plurality of intersections is associated with a unit cell, wherein the unit cell designates a set of locations nearest a corresponding intersection, the second sensor element comprising, within the unit cell, a first primary trace crossing the unit cell and second primary trace crossing the unit cell, a first secondary trace and a second secondary trace each connecting the first primary trace and the second primary trace, a first tertiary trace branching away from the first secondary trace between the first primary trace and the second primary trace, and a second tertiary trace branching away from the second secondary trace between the first primary trace and the second primary trace, wherein an area of one of the first plurality of sensor elements is greater than an area of the second sensor element within the unit cell.

16. The capacitive sensor array of claim 15, wherein the first plurality of sensor elements comprises transmit (TX) sensor elements and the second sensor element comprises a receive (RX) sensor element.

17. The capacitive sensor array of claim 15, wherein a longitudinal axis of each of the first and second secondary traces is perpendicular to the first and second primary traces at a junction between the secondary trace and the primary trace.

18. The capacitive sensor array of claim 15, wherein the first tertiary trace is aligned along a same axis as the second tertiary trace.

19. The capacitive sensor array of claim 15, wherein at least a portion of at least one of the first primary trace, the second primary trace, the first secondary trace, the second secondary trace, the first tertiary trace or the second tertiary trace falls within a second unit cell.

20. The capacitive sensor array of claim 15, wherein the unit cell further comprises a single bridge coupled to the one of the first plurality of sensor elements.

* * * * *